(12) United States Patent
Vanderveen et al.

(10) Patent No.: US 6,898,289 B2
(45) Date of Patent: May 24, 2005

(54) INTEGRATED ACTIVE NOISE ATTENUATION SYSTEM AND FLUID RESERVOIR

(75) Inventors: James K. Vanderveen, Blenheim (CA); Zhouxuan Xia, Windsor (CA)

(73) Assignee: Siemens VDO Automotive Inc., Chatham, CA (US)

( * ) Notice: Subject to any disclaimer, the term of this patent is extended or adjusted under 35 U.S.C. 154(b) by 185 days.

(21) Appl. No.: 10/071,531

(22) Filed: Feb. 7, 2002

(65) Prior Publication Data

US 2002/0071571 A1 Jun. 13, 2002

Related U.S. Application Data

(63) Continuation-in-part of application No. 09/931,394, filed on Aug. 16, 2001.
(60) Provisional application No. 60/276,211, filed on Mar. 15, 2001, provisional application No. 60/270,769, filed on Feb. 22, 2001, and provisional application No. 60/234,032, filed on Sep. 20, 2000.

(51) Int. Cl.[7] ............................ G10K 11/16; H04B 1/00
(52) U.S. Cl. ........................................ 381/71.4; 381/86
(58) Field of Search .................................. 381/71.4, 86

(56) References Cited

U.S. PATENT DOCUMENTS

| | | |
|---|---|---|
| 3,936,606 A | 2/1976 | Wanke |
| 4,410,065 A | 10/1983 | Harvey |
| 4,665,549 A | 5/1987 | Eriksson et al. |
| 4,832,262 A | 5/1989 | Robertson |
| 4,876,722 A | 10/1989 | Dekker et al. |
| 4,896,718 A | 1/1990 | Trin |
| 4,947,434 A | 8/1990 | Ito |
| 5,170,019 A | 12/1992 | Lee |
| 5,197,426 A | 3/1993 | Frangesch et al. |
| 5,229,556 A | 7/1993 | Geddes |
| 5,271,120 A | 12/1993 | Eustache et al. |
| 5,319,165 A | 6/1994 | Geddes |
| 5,336,856 A | 8/1994 | Krider et al. |
| 5,426,703 A | 6/1995 | Hamabe et al. |
| 5,426,705 A | 6/1995 | Yokota et al. |
| 5,432,857 A | 7/1995 | Geddes |
| 5,446,249 A | 8/1995 | Goodman et al. |
| 5,446,790 A | 8/1995 | Tanaka et al. |
| 5,457,749 A | 10/1995 | Cain et al. |
| 5,466,899 A | 11/1995 | Geisenberger |
| 5,513,266 A | 4/1996 | Zuroski |
| 5,541,373 A | 7/1996 | Cheng |
| 5,550,334 A | 8/1996 | Langley |
| 5,587,563 A | 12/1996 | Yazici et al. |
| 5,693,918 A | 12/1997 | Bremigan et al. |
| 5,828,759 A | 10/1998 | Everingham |
| 5,913,295 A * | 6/1999 | Sadr et al. ............. 123/198 E |
| 5,946,763 A | 9/1999 | Egner-Walter et al. |
| 6,009,705 A | 1/2000 | Arnott et al. |
| 6,084,971 A * | 7/2000 | McLean ................ 381/71.5 |
| 6,213,077 B1 | 4/2001 | Horii |

FOREIGN PATENT DOCUMENTS

EP 0884471 12/1998

* cited by examiner

Primary Examiner—F. W. Isen
Assistant Examiner—Elizabeth McChesney

(57) ABSTRACT

An active noise attenuation system (10) comprises a speaker (26) in communication with a flow body (78). The speaker (26) emits an output for attenuating noise from the flow body (78). A control unit (31) communicates with the speaker (26) and controls the output. A housing (14) has one volume (18) acting as a liquid storage chamber and another volume (22) acting as a speaker chamber.

18 Claims, 4 Drawing Sheets

INTEGRATED ACTIVE NOISE ATTENUATION SYSTEM AND FLUID RESERVOIR

This application claims priority to Provisional Patent Application Ser. No. 60/276,211 filed on Mar. 15, 2001, Provisional Patent Application Ser. No. 60/270,769 filed on Feb. 22, 2001, and is a continuation-in-part of U.S. Non-provisional application Ser. No. 09/931,394 filed on Aug. 16, 2001.

BACKGROUND OF THE INVENTION

This invention relates to a method and system of noise attenuation around an air induction assembly.

Manufacturers have employed active and passive methods to reduce engine noise within the passenger compartment. Such noise frequently emanates from the engine, travels through the air induction system and emanates out of the mouth of the air intake into the passenger compartment. Efforts have been made to reduce the amount of engine noise traveling through the air induction system. These efforts include the use of both passive devices such as expansion chambers and helmholtz resonators and active devices involving anti-noise generators.

Active systems use a speaker to create a canceling sound that attenuates engine noise. The sound created is out of phase with the engine noise and combines with this noise to result in its reduction. Generally, this sound is generated in proximity to the mouth of the air intake. In one such system, a control unit, such as a digital signal processor, obtains data from the vehicle engine, creates a predictive amount of engine noise, and thereby generates the appropriate cancellation signals based on the results of this model. The signal is then transmitted to the speaker, which transforms the signal into a canceling sound.

Typically, active noise systems are positioned in the engine compartment of vehicles. The engine compartments of vehicles are cramped and offer little additional space for an active noise attenuation system. Accordingly, the necessity of locating an active noise attenuation system in proximity to the air intake in the confined space of an engine compartment presents design challenges. Moreover, given the number of systems already present within the engine compartment, there is a need to reduce the number of components added to the engine compartment by the system.

SUMMARY OF THE INVENTION

The present invention comprises an active noise attenuation system. The active noise attenuation system has a speaker in proximity to an air intake and serves to emit an output for attenuating noise from the air intake. A control unit controls the speaker, modulating its output to thereby reduce noise. The speaker is housed in a housing that has a first chamber and a second chamber. The first chamber houses the speaker while the second chamber houses the fluid reservoir for fluids such as engine coolant or windshield wiper fluid. By combining the two chambers into a single housing, the amount of space required by the active noise attenuation system and the fluid reservoir is thereby reduced. Moreover, the number of parts within the engine compartment is also reduced.

The fluid reservoir may be in communication with the windshield wiper system or an engine cooling system. Moreover, a third fluid storage chamber may be used so that the unit may accommodate both fluid for the windshield wiper system and fluid for the engine cooling system. A plate may be disposed within the fluid volume to limit the movement of fluid contained therein. Also, each fluid reservoir may have a transparent sight glass or have a portion of the volume be sufficiently transparent to allow viewing of the fluid levels within the reservoir. By locating the active noise attenuation system near these fluid reservoirs, the unit may also be combined with a battery tray which is typically located within the same vicinity. The unit may also be combined with tubing from the air induction system and also be combined with an air filter. The invention may thus offer a single housing for a significant number of engine components, reducing the amount of space and parts required by them.

In particular, each chamber may share a common portion of the housing. Thus, a single body may define portions of the fluid storage reservoir, the chamber for the speaker of the noise attenuation system, and the battery tray. Other portions of the invention may be individualized to suit the specific requirements of each engine component. For example, while the engine coolant reservoir may share the same bottom as the speaker chamber, the upper portion of the fluid reservoir may be transparent to permit the observation of fluid levels within the volume. The speaker chamber may be opaque and have particular fittings to support the speaker. In this way, the components are integrated.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
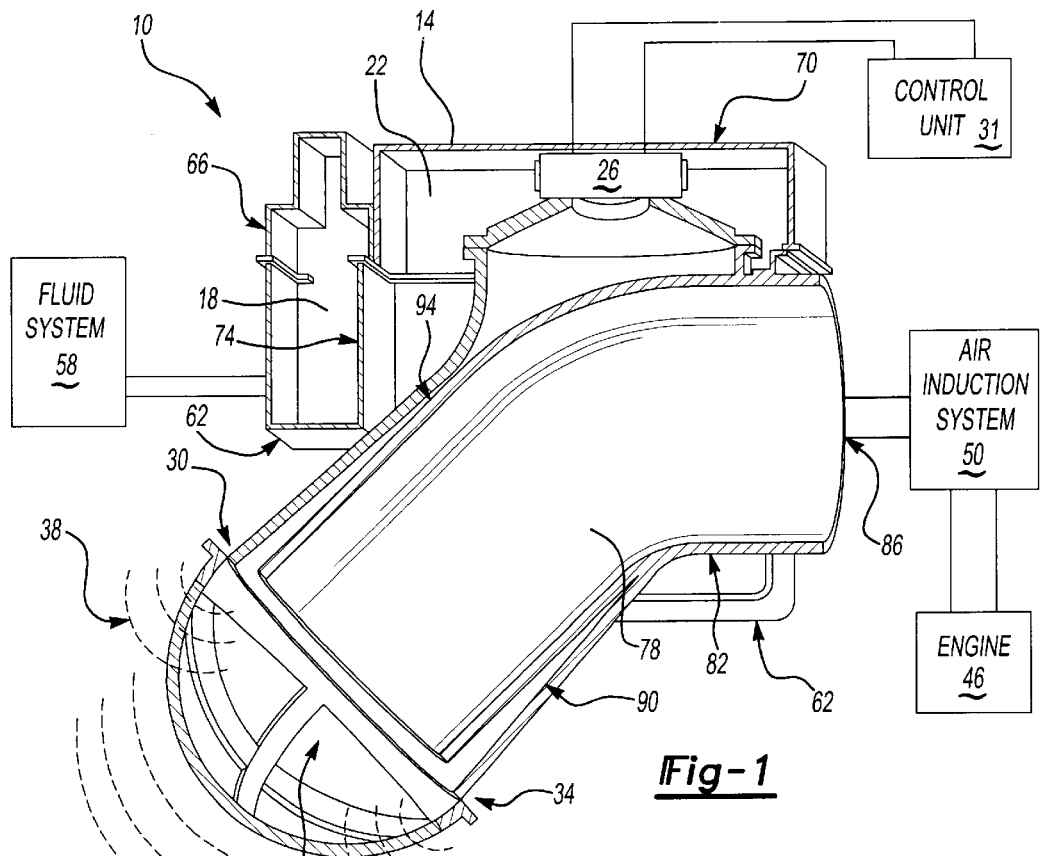
FIG. 1 illustrates the invention, including speaker chamber and liquid storage chamber.

FIG. 1 illustrates invention 10. As shown, housing 14 defines at least two volumes. One volume 22 houses speaker 26 as commonly used for a noise attenuation system. Speaker 26 is controlled by control unit 31 and generates a noise canceling sound which flows out of inlet 30 and inlet 34. Thus, as known, canceling sound 38 is propagated out of two inlets to attenuate engine noise 42 originating from engine 46, passing through air induction system 50, and out air intake 54.

By locating speaker 26 and speaker chamber 26 near the liquid storage chambers of an engine cooling system or a fluid reservoir, housing 14 maybe formed to integrate the fluid reservoir of fluid system 58. Accordingly housing 14 may comprise volume 18 acting as a liquid storage chamber, which is in fluid communication with fluid system 58, such as an engine cooling system or a windshield wiper fluid system, and volume 22 which serves as an acoustic chamber for speaker 26. Volume 22 may be formed acoustically as known to maximize noise attenuation from speaker 26. Housing 14 may comprise a single bottom portion 62 and two top portions, top portion 66 and top portion 70. Top portion 66 and top portion 70 may be vibration welded to bottom portion 62. Bottom portion 62 serves to define a portion of volume 18 and volume 22. Wall 74 divides volume 18 from volume 22. Top portion 66 may be transparent to permit the observation of the fluid level within volume 18. Top portion 70 need not be transparent since it houses speaker 26 and not a fluid but may be formed to support speaker 26.

As shown in FIG. 1, speaker 26 is in communication with air intake 54, which itself is in communication with flow body 78, air induction system 50, and engine 46. Flow body 78 is incorporated with bottom portion 62 and comprises tube 82 having end 86 in communication with air induction system and air intake 54 to receive air for air induction system 50 and engine 46. Housing 14 maybe formed around tube 82. Also, channel 90 and channel 94 are formed around tube 82 to permit the communication of sound from speaker 26 out inlet 30 and inlet 34 so as to attenuate engine noise 42. One of ordinary skill in the art can envision the attenuation of sound by directing the canceling sound along different paths relative to the air intake. By combining flow body 78, speaker 26, speaker chamber 22, and liquid storage chamber 18 into housing 14, space within the engine compartment is conserved and the number of parts within the compartment reduced.

Figure 2:
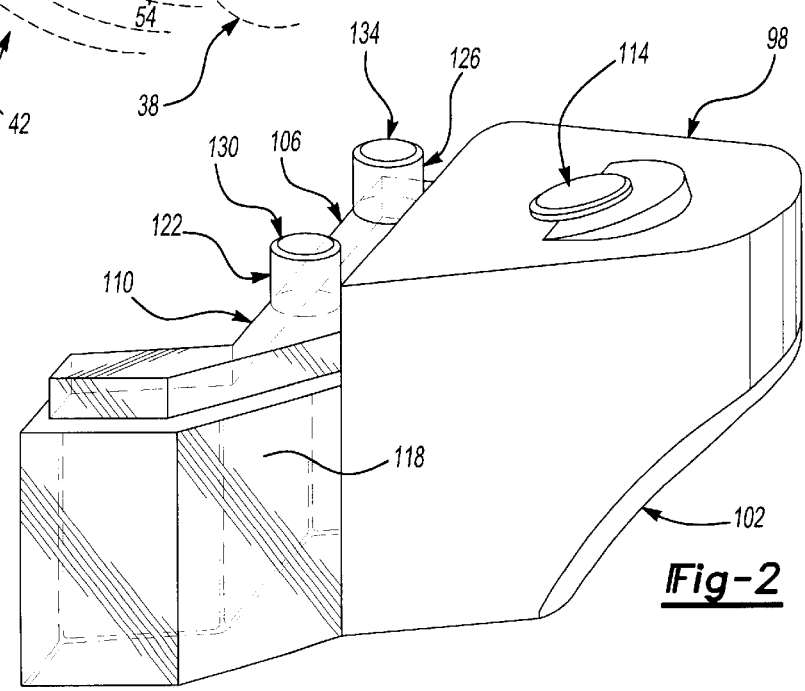
FIG. 2 illustrates another variation of the invention including speaker chamber and two liquid storage chambers.

FIG. 2 illustrates another variation of the invention. Here, housing 98 comprises three volumes: volume 102 serves as a speaker chamber for speaker 114, volume 106 serves as a liquid storage chamber for windshield wiper fluid, and volume 110 serves as a liquid storage chamber for engine coolant. As shown in FIG. 2, portions 118, 122 and 126 may be transparent to permit the observation of fluid levels within these liquid storage volumes. Also, screw caps 130 and 134 may be provided at the top of volume 106 and 110 to permit the refilling of fluid within these volumes.

Figure 3:
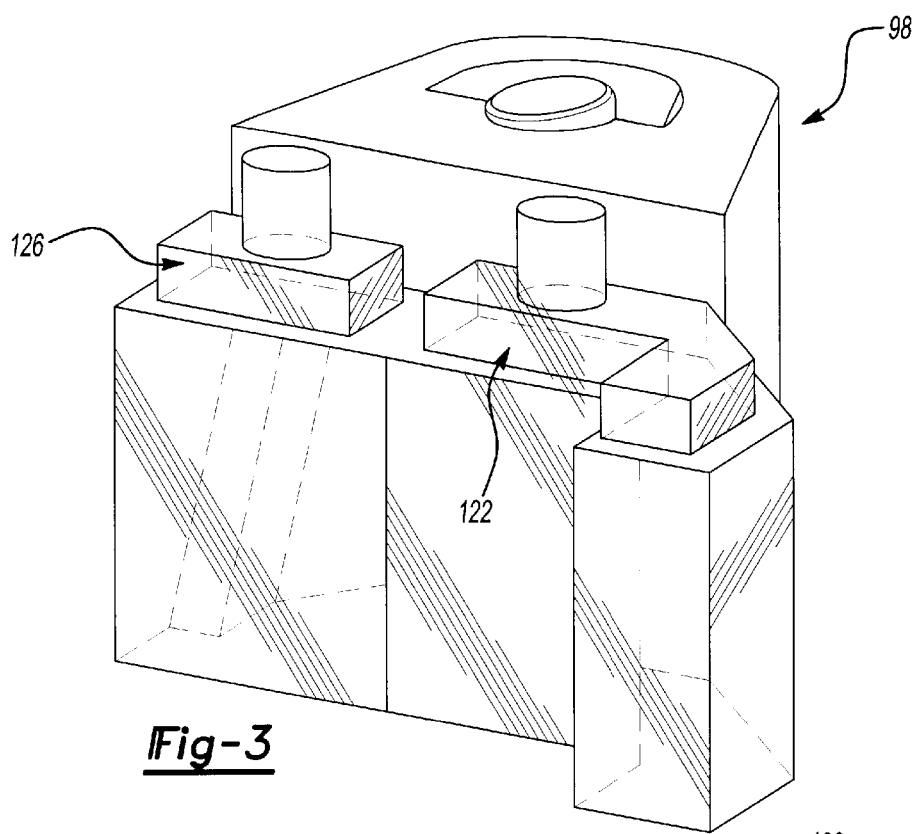
FIG. 3 illustrates another view of the invention of FIG. 2, highlighting the transparent portions of the two liquid storage chambers.

FIG. 3 illustrates another perspective of housing 98 illustrating portions 126 and 122 which may be transparent.

Figure 4:
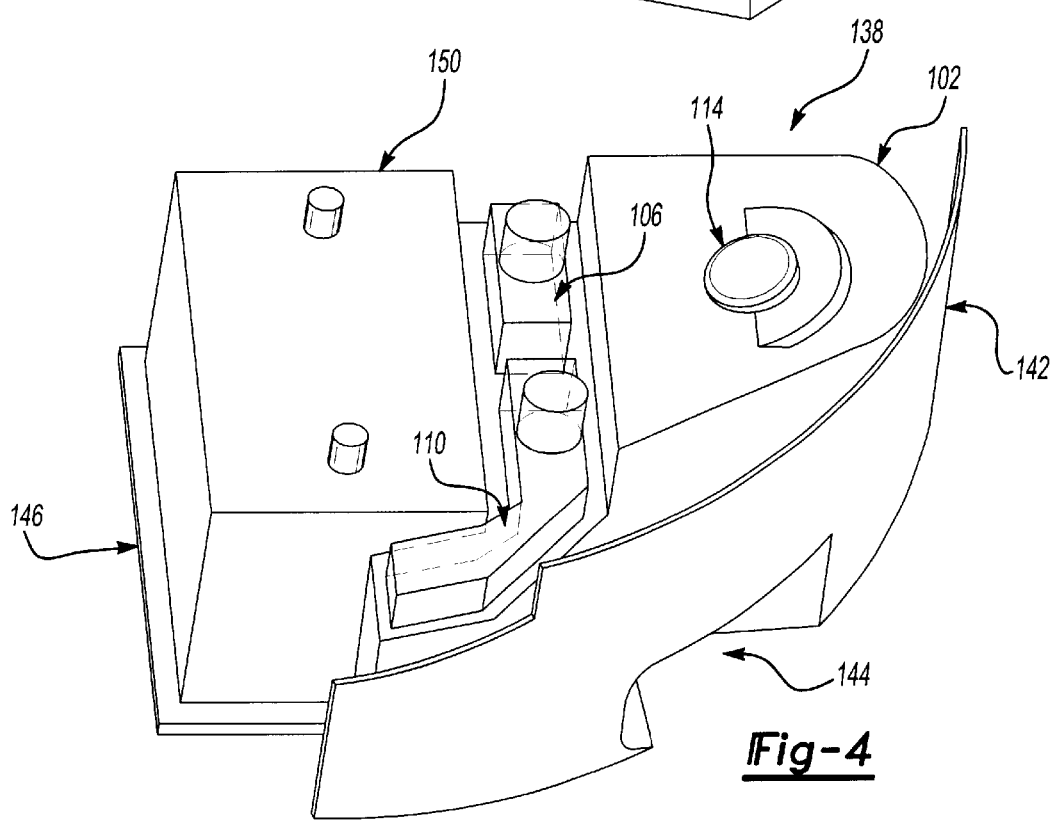
FIG. 4 illustrates another variation of the invention with an integrated battery tray.

FIG. 4 illustrates another variation of the invention. Housing 138 is comprised of volume 102 for speaker 114, volume 106 for windshield wiper fluid, volume 110 for engine coolant fluid. In addition, due to the location of speaker 114 and volume 102 within an engine compartment near fender 142 and headlight 144, housing 102 may also incorporate battery tray 146 to support battery 150. Fender 142 and headlight 144 are shown to illustrate the location of housing 102 within the engine compartment.

Figure 5:
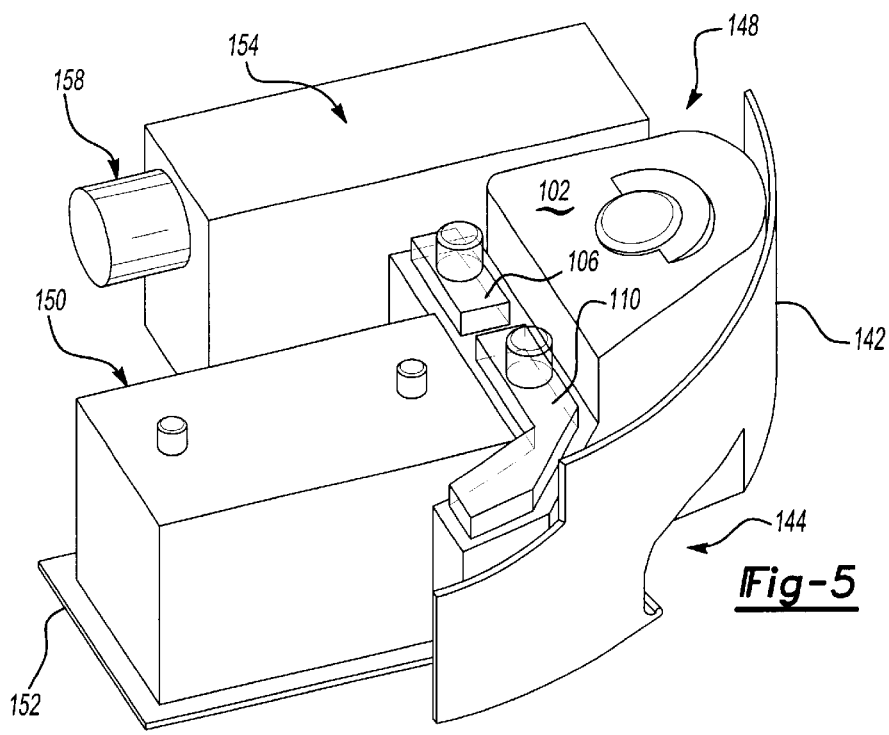
FIG. 5 illustrates another variation of the invention showing a flow body with air filter, speaker chamber, liquid storage chambers and battery tray.

FIG. 5 illustrates another variation of the invention. Housing 148 has volume 102 serving as a speaker chamber volume, volume 106 serving as a liquid storage chamber for windshield wiper fluid, and volume 110 serving as a liquid storage chamber for engine coolant fluid. Battery tray 152 serves to support battery 150, which is oriented differently in this figure than in FIG. 4. Volume 154 is incorporated with housing 148. Volume 154 serves to house a portion of flow body 158 and an air filter (not shown).

Figure 6:
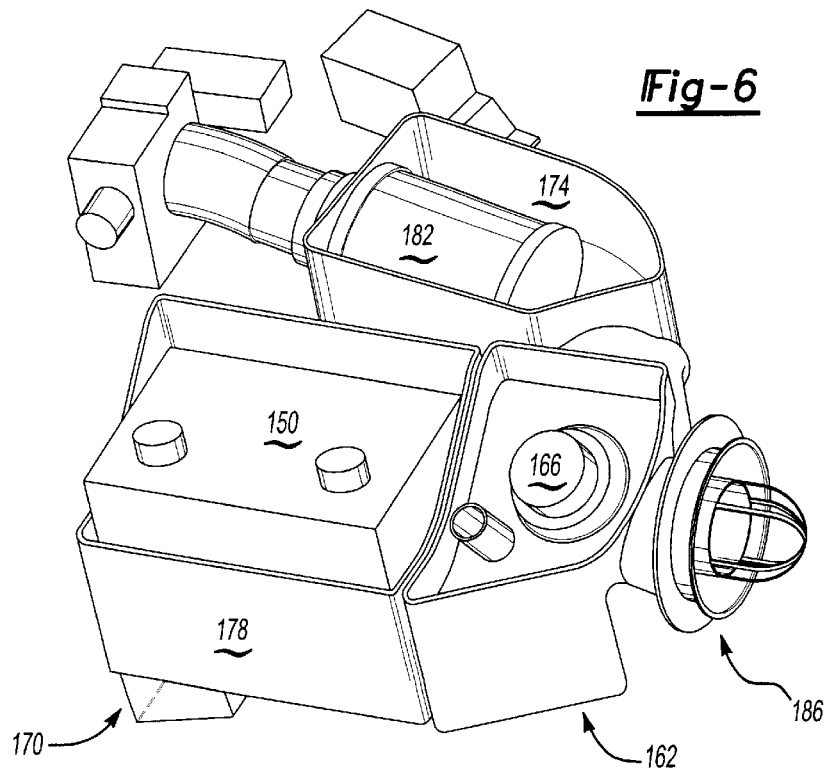
FIG. 6 illustrates another variation of the invention, highlighting liquid storage chamber, battery tray, air filter and flow body.

FIG. 6 illustrates another variation of the invention showing housing 162 comprising four volumes: volume 166 serves as a speaker chamber volume, volume 170 serves as a fluid storage reservoir for a fluid such as an engine coolant or windshield wiper, volume 174 serves as an air induction volume and volume 178 serves as a volume for storage of battery 150. Within volume 174 is air filter 182. Volume 174 is in communication with air intake 186 so as to permit air to reach an air intake system through air filter 182.

Figure 7:
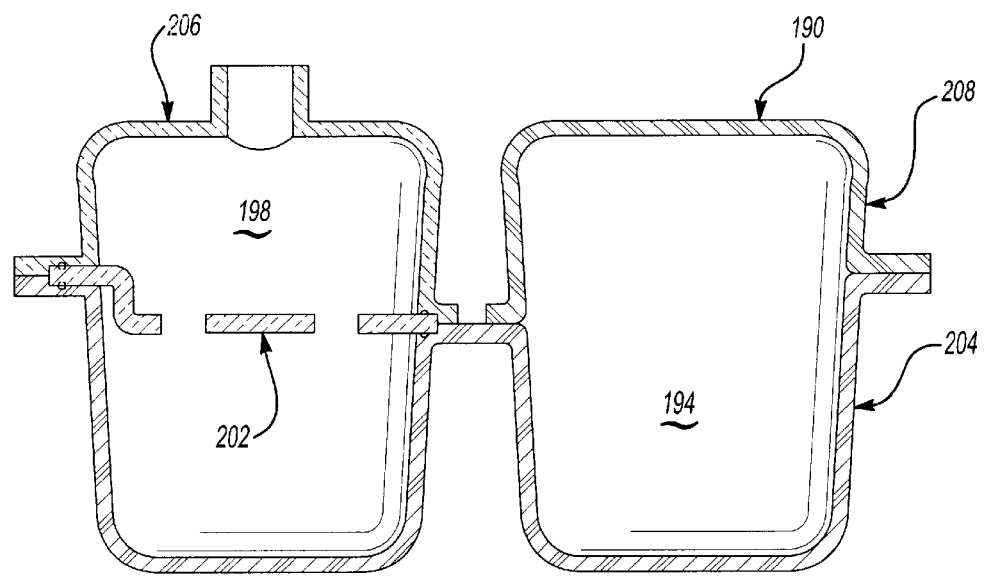
FIG. 7 illustrates a cross sectional view of another variation of the invention, showing speaker chamber, liquid storage chamber, and baffle contained within liquid storage chamber.

FIG. 7 illustrates housing 190, which comprises volume 194 for housing a speaker and volume 198 for storing a fluid. Volume 198 also has plate 202 level within volume 198 to limit the movement of fluid within this volume. Plate 202 serves as a baffle and may be located at the desired maximum fluid level for volume 198. Plate 202 may be transparent and may be used to assist in filling the fluid to a maximum level. In addition, housing 190 has three portions, bottom portion 204, which defines volumes 194 and 198, and top portion 206 and 208. Top portion 206 may be transparent. Top portion 206 serves to define the remainder of volume 198 while top portion 208 serves to define the remainder of volume 194.

Figure 8:
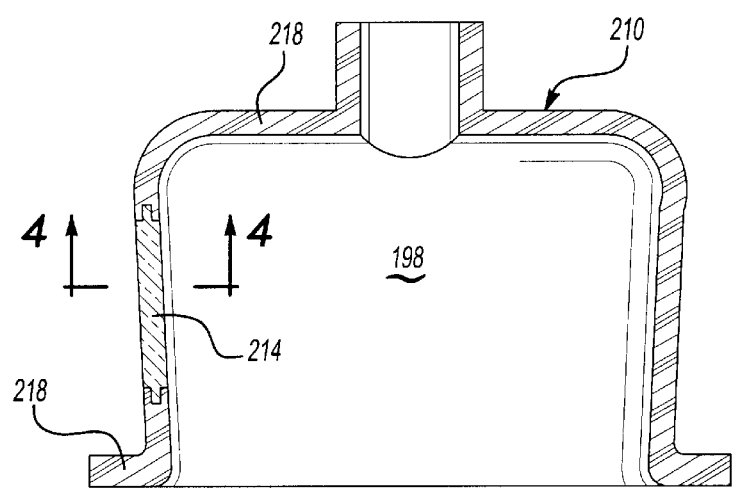
FIG. 8 shows a close up of the liquid storage chamber portion of the housing with a fluid sight glass.
Figure 9:
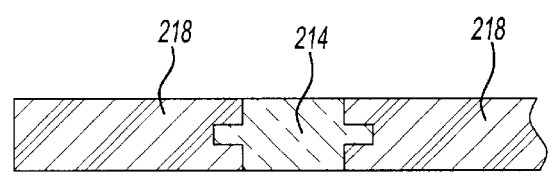
FIG. 9 illustrates another view of the sight glass of FIG. 8.

As shown in FIG. 8 and FIG. 9, rather than employing a transparent top portion, a sight glass may be used. Transparent plastic strip 214 may be incorporated with housing 210 and raised slightly above its surface outside of volume 198 to permit the viewing of fluid contained within this volume. As shown in FIG. 9, transparent plastic strip 214 is sandwiched by walls 218 of housing 210. Thus, walls 218 may be opaque while transparent plastic strip 214 may be clear.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An active noise attenuation system comprising:
   a speaker in communication with a vehicle's flow body, said speaker for emitting an output for attenuating noise from said flow body;
   a control unit in communication with said speaker, said control unit for controlling said output;
   a housing comprising a first volume defining at least a portion of a liquid storage chamber; and
   a second volume defining at least a portion of a chamber housing said speaker,
   wherein said housing comprises at least one housing portion defining at least a portion of said first volume and said second volume.

2. The active noise attenuation system of claim 1 wherein said first volume is in fluid communication with a windshield wiper system.

3. The active noise attenuation system of claim 1 wherein said first volume is in fluid communication with an engine cooling system.

4. The active noise attenuation system of claim 1 including a plate disposed within said first volume to limit movement of a fluid contained in said first volume.

5. The active noise attenuation system of claim 1 wherein said first volume comprises at least a portion sufficiently transparent to permit the viewing of a fluid within said first volume.

6. An active noise attenuation system comprising;
a speaker in communication with a vehicle's flow body, said speaker for emitting an output for attenuating noise from said flow body;
a control unit in communication with said speaker, said control unit for controlling said output;
a housing comprising a first volume defining at least a portion of a liquid storage chamber;
a second volume defining at least a portion of a chamber housing said speaker; and
wherein said housing includes a third volume defining a liquid storage chamber,
wherein said housing comprises at least one housing portion defining at least a portion of said first volume and said second volume.

7. An active noise attenuation system comprising;
a speaker in communication with a vehicle's flow body, said speaker for emitting an output for attenuating noise from said flow body;
a control unit in communication with said speaker, said control unit for controlling said output;
a housing comprising a first volume defining at least a portion of a liquid storage chamber;
a second volume defining at least a portion of a chamber housing said speaker; and
a battery tray defined by a portion of said housing,
wherein said housing comprises at least one housing portion defining at least a portion of said first volume and said second volume.

8. An active noise attenuation system comprising;
a speaker in communication with a vehicle's flow body, said speaker for emitting an output for attenuating noise from said flow body;
a control unit in communication with said speaker, said control unit for controlling said output;
a housing comprising a first volume defining at least a portion of a liquid storage chamber;
a second volume defining at least a portion of a chamber housing said speaker;
an air filter disposed within said flow body within said housing; and
wherein said housing supports said flow body,
wherein said housing comprises at least one housing portion defining at least a portion of said first volume and said second volume.

9. An active noise attenuation system comprising;
a speaker in communication with a vehicle's flow body, emitting an output for attenuating noise from said flow body;
a control unit in communication with said speaker, controlling said output;
a housing comprising a first volume defining at least a portion of a first liquid storage chamber, a second volume defining at least a portion of a second liquid storage chamber; and
a third volume defining a chamber for housing said speaker wherein said housing comprises at least one housing portion defining at least a portion of said first volume, said second volume, and said third volume,
wherein said housing comprises at least one housing portion defining at least a portion of said first volume and said second volume.

10. The active noise attenuation system of claim 9 wherein said first volume is in fluid communication with a windshield wiper system and said second volume is in fluid communication with an engine cooling system.

11. The active noise attenuation system of claim 9 including a plate disposed at least in one of said liquid storage chambers, limiting movement of a fluid contained in said liquid storage chamber.

12. The active noise attenuation system of claim 9 wherein at least one of said liquid storage chambers comprises at least a portion sufficiently transparent to permit the viewing of a fluid within said liquid storage chamber.

13. The active noise attenuation system of claim 9 including a battery tray defined by a portion of said housing.

14. The active noise attenuation system of claim 9 wherein said housing supports said flow body.

15. The active noise attenuation system of claim 14 including an air filter disposed within said flow body within said housing.

16. A method of manufacturing an active noise attenuation device comprising the steps of:
locating a speaker in proximity to a vehicle's flow body;
housing the speaker;
locating the speaker in proximity to a liquid storage chamber;
using a first portion of the said housing to define a speaker chamber within the housing; and
using a second portion of the said housing to define at least a portion of the liquid storage chamber within the housing,
wherein said housing comprises at least one housing portion defining at least a portion of said first volume and said second volume.

17. The method of manufacturing the noise attenuation device of claim 16 wherein the first portion also defines the liquid storage chamber and the second portion also defines the speaker chamber housing.

18. The method of manufacturing the noise attenuation device of claim 16 including the step of generating a sound from the speaker to attenuate noise from the flow body.

* * * * *